No. 729,759. PATENTED JUNE 2, 1903.
N. W. GREGG.
AUTOMATIC APPARATUS FOR MAKING ICE AND REFRIGERATING CARS.
APPLICATION FILED JULY 9, 1902.
NO MODEL. 2 SHEETS—SHEET 2.

Witnesses:
N. G. Orwig.
J. W. Copeland.

Inventor: Niles W. Gregg,
By Thomas G. Orwig,
Attorney.

No. 729,759.

Patented June 2, 1903.

UNITED STATES PATENT OFFICE.

NILES W. GREGG, OF DES MOINES, IOWA.

AUTOMATIC APPARATUS FOR MAKING ICE AND REFRIGERATING CARS.

SPECIFICATION forming part of Letters Patent No. 729,759, dated June 2, 1903.

Application filed July 9, 1902. Serial No. 114,912. (No model.)

*To all whom it may concern:*

Be it known that I, NILES W. GREGG, a citizen of the United States, residing at Des Moines, in the county of Polk and State of Iowa, have invented a new and useful Automatic Apparatus for Making Ice and Refrigerating Cars, of which the following is a specification.

In mechanical refrigeration a motor is required for operating the pump and condenser. To reduce the cost in refrigerating cars by the operation of an ice-making and air-cooling apparatus in a railway-car while in transit, it is my purpose to dispense with a motor that consumes hot air, steam, or electricity, and consequently to avoid the expense incident to utilizing such force in refrigeration railway-cars.

A further object is to maintain a dry cold atmosphere in a car that is provided with proper means of ventilation by confining cold air and water in circulating-pipes, from which cold is radiated to effect the dry atmosphere, as required for the preservation of meat and other perishable merchandise stored in a car for transportation.

My invention consists in the arrangement and combination of a compressor-pump and means for utilizing the inertia of a car while in motion by transferring power and motion from the car to the pump, as hereinafter set forth, pointed out in my claims, and illustrated in the accompanying drawings, in which—

Figure 1:
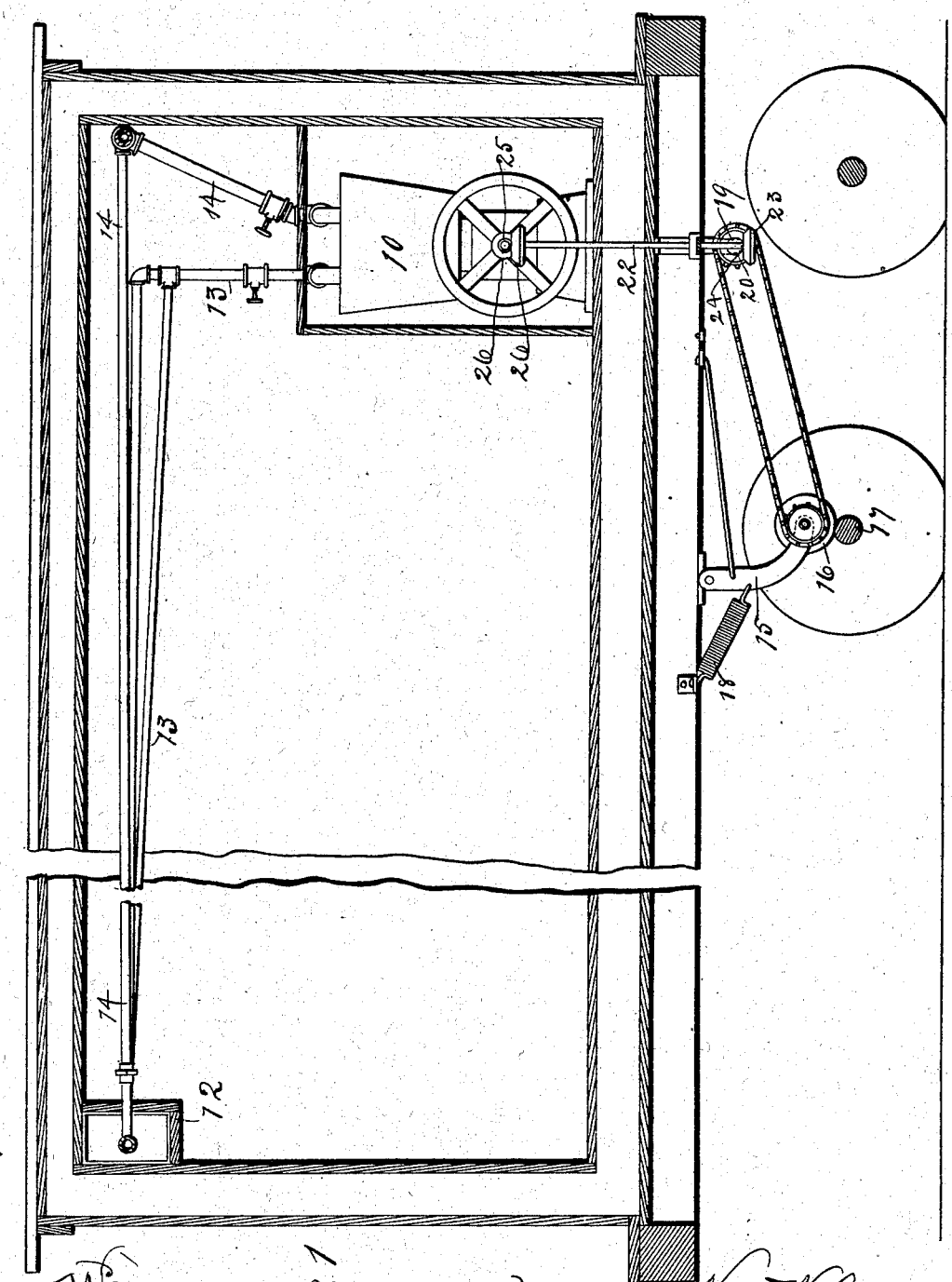
Figure 2:
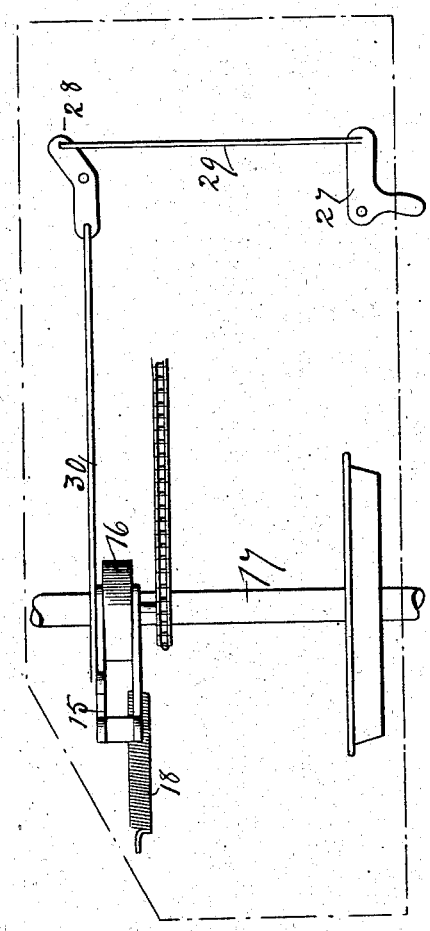

Figure 1 is a vertical sectional view of a car and shows the relative positions of the different parts as required to coöperate in accomplishing the results contemplated by my invention. Fig. 2 is a detail view of the mechanism adapted to be combined with a car-axle and a rotary pump, as shown in Fig. 1, for the purpose of transmitting power and motion from a moving car to a pump carried in the car.

The numeral 10 designates a rotary condensing-pump fixed and inclosed in one end of a car, and 12 is a tank fixed in the top of the other end portion of the car. A pipe 13 extends from the pump to the tank for conveying vapors and water from the pump to the tank, and a plurality of pipes 14 extend from the condensing and freezing tank to the pump to produce circulation of vapor and liquid between the pump and tank, as required to make the pipes cold and to produce by radiation from the pipes a refrigerating atmosphere in the car for preserving perishable vegetable and animal matter stored in the car. It is obvious the size and number of the pipes and manner of connecting them with each other and the pump and tank may vary as desired.

A pulley-bearer 15 is pivotally connected with the car, as shown in Fig. 1, or in any suitable way in such a manner that a friction-pulley 16, mounted in the free end of the bearer, will contact with the rotatable axle 17 of a car. A coil-spring 18 is fixed to the pulley-bearer and the car in such a manner that it will normally press the pulley upon the axle as required to increase friction.

A rotatable shaft 19 is supported in a horizontal position in bearers fixed to the car, and 20 is a sprocket-wheel fixed to the shaft. The pulley 16 on the car-axle 17 and the pulley 20 on the shaft 18 are connected by a chain and sprockets, as shown in Fig. 1, or in any suitable way.

A rotatable shaft 22 is mounted in bearings fixed to the car to extend vertically and connected with the shaft 19 by means of a miter friction-wheel 23, fixed to its lower end, and a corresponding miter friction-wheel 24, fixed on the shaft 19, as required to transmit power and motion from the shaft 19 to the shaft 22, and the top of the shaft 22 is connected with the driving-shaft 25 of the pump by means of a miter friction-wheel 26 on the top of the shaft 22 and a corresponding wheel on the driving-shaft 25, as shown in Fig. 1, or in any suitable way, so that power and motion will be communicated from the car-axle to the driving-shaft of the pump when the car is in motion. To disconnect the communication thus established between the car-axle and the pump-shaft, a bell-crank lever 27 is fulcrumed to the bottom of the car and connected with a second bell-crank lever 28, pivoted to the bottom of the car by a rod 29, and the lever 28 is connected with the pulley-bearer by a rod 30, as shown in Fig. 3, or in any suitable way, in such a manner that by operating the lever 27 the pulley-bearer can be elevated as required to disconnect the pulley from the car-axle, and when the lever is pressed far enough the rod 29 will pass the center of motion of the lever and retain it stationary, as required to carry the machinery inoperative, whenever desired.

Having thus described the purpose of my invention and the construction, arrangement, and combination of the different parts of the apparatus, its practical operation and utility will be understood by persons familiar with the art to which it pertains.

What I claim as new, and desire to secure by Letters Patent, is—

1. In an apparatus for refrigerating a car, a pulley-bearer pivotally connected with the bottom of a car, a friction-pulley mounted in the free end of the bearer and a spring fixed to the car and to the pulley-bearer to press the pulley upon the car-axle for actuating sprockets and a chain, arranged and combined to operate in the manner set forth for the purposes stated.

2. In an apparatus for refrigerating a car, a pulley-bearer pivotally connected with the bottom of a car, a friction-pulley mounted in the free end of the bearer and a spring fixed to the car and to the pulley-bearer to press the pulley upon the car-axle, a sprocket-wheel fixed to the axle of said pulley, a rotatable shaft in bearers fixed to the car to extend horizontally, a sprocket-wheel on the shaft and a chain on the two sprocket-wheels, arranged and combined to operate in the manner set forth for the purposes stated.

3. In an apparatus for refrigerating a car, a pulley-bearer pivotally connected with the bottom of a car, a friction-pulley mounted in the free end of the bearer and a spring fixed to the car and to the pulley-bearer to press the pulley upon the car-axle, a sprocket-wheel fixed to the axle of said pulley, a rotatable shaft in bearers fixed to the car to extend horizontally, a sprocket-wheel on the shaft and a chain on said sprocket-wheel, a rotatable shaft in bearings fixed to the car to project vertically, a miter friction-wheel on the horizontal shaft and a mating wheel on the vertical shaft, arranged and combined to operate in the manner set forth for the purposes stated.

4. In an apparatus for refrigerating a car, a pulley-bearer pivotally connected with the bottom of a car, a friction-pulley mounted in the free end of the bearer and a spring fixed to the car and to the pulley-bearer to press the pulley upon the car-axle, a rotatable shaft in bearers fixed to the car to extend horizontally, a friction-pulley on the shaft and a belt on the two pulleys, a rotatable shaft in bearings fixed to the car to project vertically, a miter friction-wheel on the horizontal shaft and a mating wheel on the vertical shaft, in combination with a compressor-pump in a car, to operate in the manner set forth for the purposes stated.

NILES W. GREGG.

Witnesses:
H. C. FICKE,
THOS. D. GAMBLE.